July 29, 1958  M. R. COOLEY  2,844,935
ROTARY SIDE DELIVERY WHEEL RAKE
Filed June 3, 1955  3 Sheets-Sheet 1

MORRIS R. COOLEY
INVENTOR
HUEBNER, BEEHLER,
WORREL & HERZIG
ATTORNEYS
BY
Richard M. Worrel July 29, 1958　　　M. R. COOLEY　　　2,844,935
ROTARY SIDE DELIVERY WHEEL RAKE
Filed June 3, 1955　　　　　　　　　　3 Sheets-Sheet 2

MORRIS R. COOLEY
INVENTOR
HUEBNER, BEEHLER,
WORREL & HERZIG
ATTORNEYS
BY

July 29, 1958 — M. R. COOLEY — 2,844,935
ROTARY SIDE DELIVERY WHEEL RAKE
Filed June 3, 1955 — 3 Sheets-Sheet 3

MORRIS R. COOLEY
INVENTOR
HUEBNER, BEEHLER,
WORREL & HERZIG
ATTORNEYS
BY
Richard M. Worrel

United States Patent Office 2,844,935
Patented July 29, 1958

2,844,935

ROTARY SIDE DELIVERY WHEEL RAKE

Morris R. Cooley, Tulare, Calif., assignor, by mesne assignments, of one-half to Herbert A. Huebner, Los Angeles, and one-half to Richard M. Worrel, Fresno, Calif.

Application June 3, 1955, Serial No. 513,111

12 Claims. (Cl. 56—377)

The present invention relates to side delivery rakes and more particularly to rotary side delivery wheel rakes and to an improved frame structure therefor.

The present invention is a companion improvement of the Melvin A. Morrill "Rotary Side Delivery Rake" of United States Patent No. 2,447,354 to that shown in my co-pending application S. N. 500,718 filed April 12, 1955 and entitled "Rotary Side Delivery Wheel Rake." In my co-pending application, certain improvements in rotary side delivery wheel rakes significant to the instant invention are reviewed. It is believed sufficient herein to observe that in an effort to improve, to refine and to render more economical side delivery rakes of the type shown in the designated Morrill patent, simplified forms of crank arms have been quite generally employed to mount the plurality of raking wheels in echelon arrangement and for the desired floating movement. In addition, efforts have been made to improve and simplify the frame structures employed in such rakes including the elimination of arch bars, at one time considered to be a necessary element of all pull type, or drawn, rakes of the designated character.

The previous application disclosed a rake of the character described in which it was for the first time practical to position mounting beams or frames for the raking wheels forwardly of said wheels so as to avoid arch bars in pull rakes. As stated therein, this advance was made possible by the discovery that the raking wheels involved could be mounted successfully on crank arms having axle portions rotatably mounting the wheels forwardly of the pivotal mountings of the crank arms in a frame provided for the purpose. In other words, the crank arms were pivotally mounted in the frame and forwardly extended from such pivotal mountings to positions of wheel mounting, as contrasted with former rearward extension of such crank arms.

The resulting rakes disclosed in the previous application are tractor mounted for elevational movement to and from operable positions. While excellently suited to their purposes and productive of significant attributes not reviewed herein, they were limited to use with tractors or other motivating means having suitable mounting facilities. This limitation unnecessarily restricted the utilization and enjoyment of the improved rakes. The broad essence of the present invention resides in the making of the advantages of the previous invention applicable to any source of tractive power suitable for imparting earth traversing movement to the rakes.

An object of the present invention is, therefore, to make the advantages of said previous invention more widely applicable.

Another object is to improve rotary side delivery wheel rakes of the character shown in U. S. Patent No. 2,447,354.

Another object is to provide a rotary side delivery wheel rake of the ground supported pull type which avoids the employment of arch bars in spanning relation to raking wheels employed therein.

Another object is to provide a rotary side delivery wheel rake of the pull type which utilizes a raking wheel mounting beam or frame forwardly of the raking wheels and which is not limited to tractors and other prime movers providing means of principal support for the rake.

Another object is to provide a rotary side delivery wheel rake of the pull type which utilizes a raking wheel mounting beam or frame forwardly of the raking wheels and which provides its own ground engaging support wheels without the utilization of arch bars.

Another object is to lighten the frame construction in rakes of the nature described without reducing the durability thereof.

Another object is to render easier the handling, hitching, and maneuverability of rotary side delivery wheel rakes.

Another object is to improve the balance of frames employed in rotary side delivery wheel rakes of the pull type.

Another object is to reduce the weight on a drawbar of a tractor, or other prime mover, heretofore normally imposed by rotary side delivery wheel rakes of the pull type.

Another object is to provide a frame for a rotary side delivery wheel rake having raking wheels in overlapping echelon arrangement in which provision is made for mounting ground engaging support wheels centrally of the frame without interfering with the operation and/or positioning of the echelon arrangement of such raking wheels.

Further objects and advantages will become apparent upon reference to the subsequent description in the specification.

Figure 1:
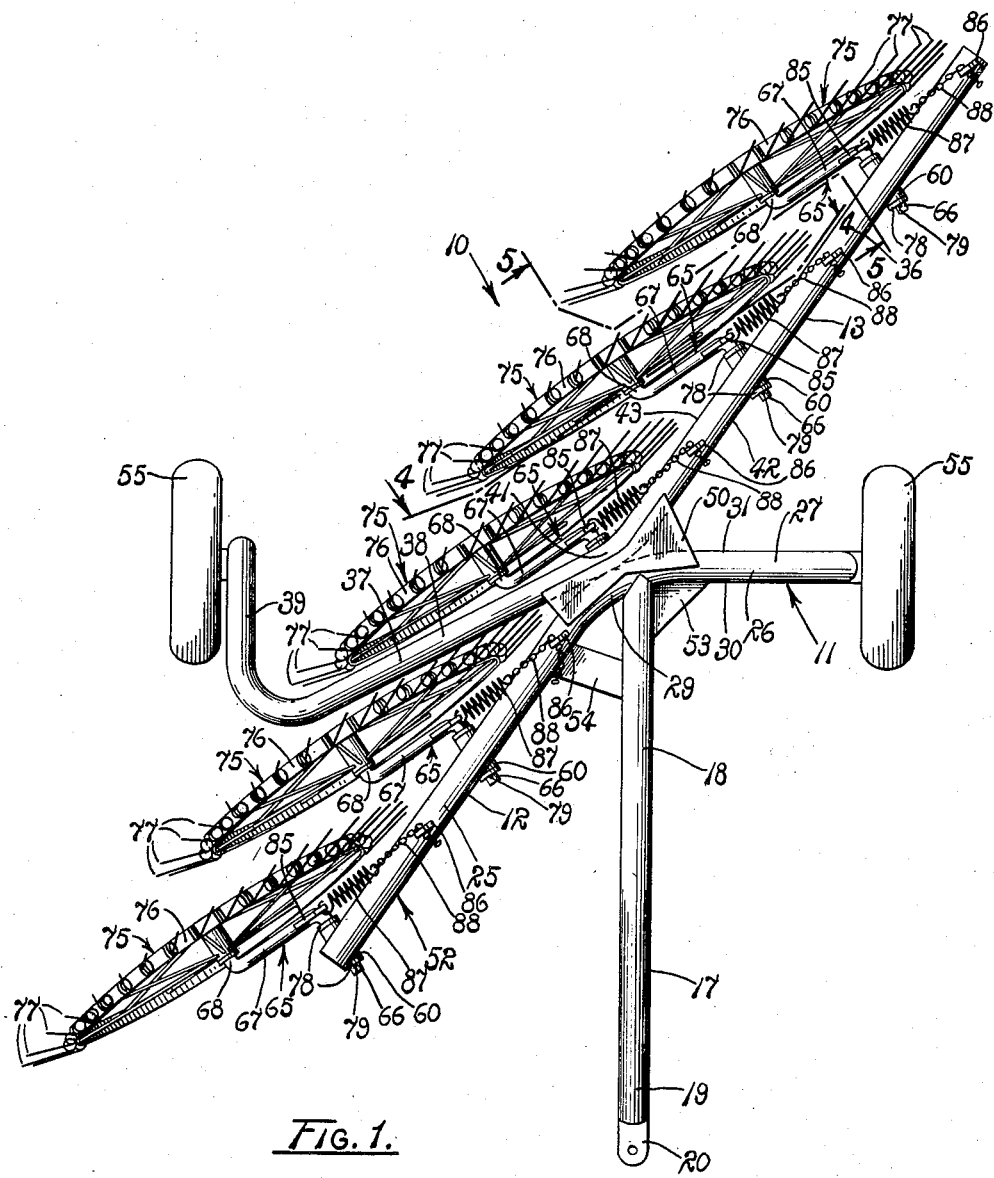
Fig. 1 is a top plan view of a rotary side delivery rake embodying the principles of this invention.
Figure 2:
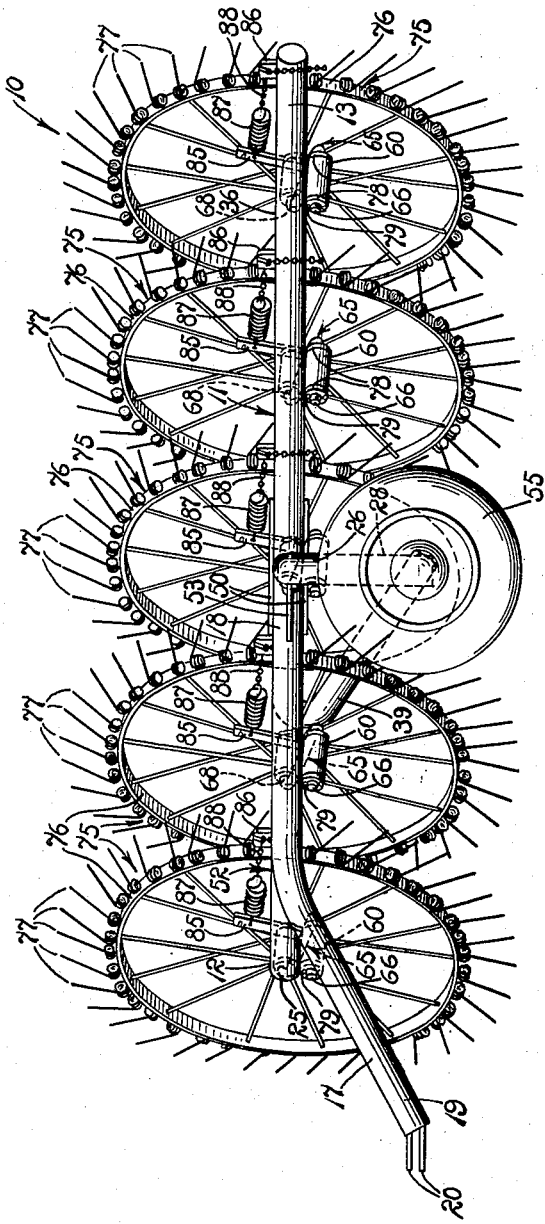
Fig. 2 is a side elevation of the rake shown in Fig. 1, as viewed from the left of the rake relative to its line of movement.
Figure 3:
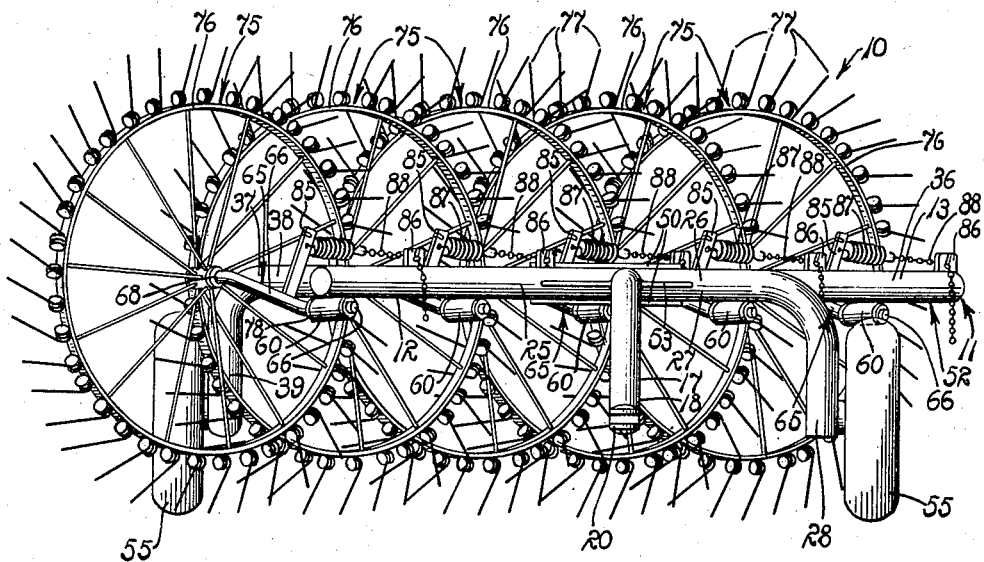
Fig. 3 is a front elevation of the rake shown in Fig. 1.
Figure 4:
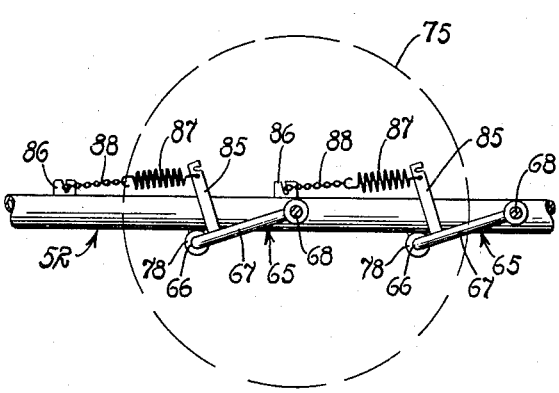
Fig. 4 is a fragmentary vertical section taken on line 4—4 of Fig. 1 and showing a raking wheel in dashed lines therein to illustrate the relative position thereof.
Figure 5:
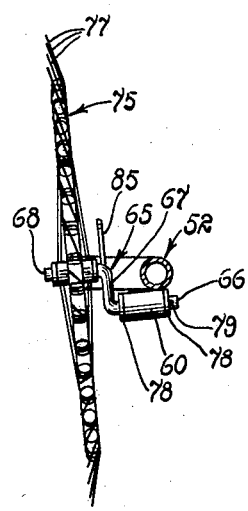
Fig. 5 is a vertical section taken on line 5—5 of Fig. 1 showing a raking wheel and mounting therefor.

Referring more particularly to the drawings:

A rotary side delivery rake 10 is shown in Figs. 1, 2 and 3 and includes a support frame 11 having a predetermined forward frame member or beam 12 and a predetermined rearward frame member or beam 13. The frame 11 provides an elongated tongue 17 conveniently having a substantially horizontal rearward portion 18 and a downwardly forwardly extended portion 19. A suitable draft connection 20 is rigidly secured to the forward end portion of the tongue. The tongue is thus adapted for connection to a suitable prime mover, not shown, thereby to guide the frame in a predetermined forward direction of earth traversing movement or line of travel in substantial alignment with the tongue.

The forward frame member 12 includes a substantially straight raking wheel mounting portion 25 forwardly obliquely extended relative to the predetermined forward direction of movement of the frame 11. The forward frame member also includes a wheel support mounting portion 26 laterally extended from the frame in substantially transverse relation to said predetermined forward direction and being arcuately continuous with the forward end portion 25 and rearwardly and laterally extended therefrom. The support wheel mounting portion has an inner substantially horizontal section 27 and an outer downwardly extended section 28. The forward frame member also includes an intermediate arcuate elbow portion 29, to which significant reference is subsequently made, integrally interconnecting the raking wheel and supporting wheel mounting portions. Thus arranged, the forward frame member provides a forward concave side 30 and a rearward convex side 31.

The rearward frame member 13 includes a raking wheel mounting arm portion 36 rearwardly obliquely extended relative to the predetermined forward direction of travel of the frame 11 in substantially axial alignment with the forward end portion 26 of the forward frame member 12. In addition, the rearward frame member has a supporting wheel mounting arm portion 37 which includes an inner section 38 forwardly obliquely extended relative to said predetermined line of travel and rearwardly spaced from the forward end portion of the forward frame member, and an outer section 39 rearwardly downwardly extended from the inner section. Further, the rearward frame member provides an intermediate arcuate elbow portion 41 integrally interconnecting the forward and rearward end portions thereof. Thus, the rearward frame member provides a forward convex side 42 and a rearward concave side 43. In commercial embodiments of the rake, the frame portions 12 and 13 are conveniently formed from tubing by suitable bending operations.

Many other structural materials and methods of formation will occur to those skilled in the art and the present invention in no sense is limited to any precise method of fabrication or other formation.

The forward and rearward frame members 12 and 13 are rigidly interconnected intermediate their respective end portions 25, 26 and 36, 37 with the major portions thereof in a substantially common horizontal plane. For this purpose, the elbow portions 29 and 41 of the frame members are placed in back-to-back relation so that the rearward convex side 31 of the forward frame member is in opposed facing relation to the forward convex side 42 of the rearward frame member and in abutting or closely adjacent relation thereto. A pair of gusset plates 50 are connected, as by welding, to the elbow portions of the frame members above and below the abutment or point of nearest approach thereof. In addition, the frame members may be strengthened by welded interconnection of the elbow portions.

When the frame members 12 and 13 are connected as described above, the frame 11 is substantially X-shaped in configuration with the rearward end portion 36 of the rearward frame member 13 and the forward end portion 25 of the member 12 constituting a leg of the X aligned and extended across the other leg of the X formed by the forward end portion of the frame member 13 and the rearward end portion 26 of the frame member 12. The end portion 36 is in acute angular relation to the rearward end portion 26 of the forward frame member 12, and the rearward end portion 36 of the rearward frame member 13 is in substantially continuous horizontal axial alignment with the forward end portion 25 of the forward frame member 12. So related, the rearward end portion of the rearward frame member and the forward end portion of the forward frame member constitute a main raking wheel mounting beam generally indicated by numeral 52, obliquely related to the predetermined line of travel of the frame. It is to be understood that, for descriptive convenience, whenever reference is made hereinafter to the main beam that it is intended to mean the forward and rearward end portions 25 and 36, respectively, of the forward and rearward frame members 12 and 13 arranged in the above described relation.

The rearward end 18 of the tongue 17 is connected, as by welding, to the concave side 30 of the elbow portion 29 of the forward frame member 12 in substantially right angular relation to the rearward end portion 27. To impart strength to the frame 11, a gusset plate 53 is connected between end portion 26 and the tongue and a brace 54 is connected between the forward end portion 25 of the forward frame membr 12 and the tongue.

A pair of ground engaging support wheels 55 are rotatably mounted on the downwardly disposed sections 28 and 39 of the forward and rearward frame members 12 and 13, respectively, for rotation about a substantially common axis normal to the predetermined forward direction of movement or travel of the frame 11.

A plurality of bearings 60 are mounted transversely of the main beam 52 in substantially parallel relation. The bearings are in adjacent angular relation to the horizontal, being mounted on the beam at slightly forwardly inclined acute angles relative to the horizontal and have forwardly extended end portions in acute angularity with respect to the predetermined direction of movement of the frame 11 at the opposite lateral side of said predetermined direction of movement as compared with the forwardly disposed angularity of the beam 52 relative thereto.

A plurality of crank arms 65 are individually pivotally mounted in the bearings 60. Each crank arm has a pivot journal 66 rotatably received in its bearing, an arm portion 67 integral with the pivot journal forwardly extended therefrom along the rearward side of the main beam 52, and an axle portion 68 substantially parallel to the pivot journal integral with the extended end of the arm portion 67 and rearwardly and laterally extended therefrom. It will be observed that each of the axle portions of the crank arms are disposed at substantially the same angle to the predetermined direction of travel as its bearing, and at substantially the same angle of rearward declination as the forward inclination of its respective bearing. It is also to be noted that each axle portion is forwardly and laterally adjacent to its respective pivot journal 66.

A plurality of rotary raking wheels 75 are rotatably mounted on the axle portions 68 of the crank arms 65 for free rotation and individual elevational movement in substantially parallel planes oblique to the direction of travel. The wheels provide concentric rims 76 mounting resilient raking teeth 77 thereon. The teeth provide extended tines in rearwardly directed angular relation to the planes of their respective wheels and in rearwardly angled relation relative to the direction of rotation of the wheels incident to rolling movement of earth traversed. The wheels are mounted in planes acuately angularly rated to vertical planes coincident with said predetermined direction of earth traversing movement and are disposed on the opposite side of a vertical plane coincident with the beam 52 from said coincident planes. The wheels are also mounted at acute angles relative to the vertical with their lowermost peripheral portions slightly forwardly in advance of their uppermost peripheral portions.

In mounting the rake wheels 75 and their crank arms 65, thrust washers 78 are preferably provided at opposite sides of each bearing and the wheels are retained on their respective axle portions 68, the crank arm being retained in its bearing 60 by cotter key 79 extended through outer end of the pivot journal 66.

To lighten engagement of the raking wheels 75 on earth traversed and/or rakeable substance disposed on the ground, a lever 85 is upwardly extended from each crank arm 65. Bifurcated locks 86 are mounted on the main beam 52 rearwardly adjacent to each lever 85. A tension spring 87 is connected to each of the levers and to each of the chain locks by means of a chain 88 secured to the spring and having links selectively located in the lock to adjust the tension of the spring. For best operation, the spring tension is such that the raking teeth 77 engage the ground and/or rakeable substance deposed on the ground lightly during earth traversing movement.

It is to be noted that the above arrangement is such that the raking wheels 75 are in overlapping echelon arrangement at substantially parallel planes obliquely related to the predetermined line of travel of the frame 11. In addition, the forward end portion 37 of the rearward frame member 13 extends outwardly of said echelon arrangement between a pair of adjacent raking wheels. As shown in the drawings, this forward end portion preferably extends between the second and third raking wheel as counted from the forward to the rearward ends of the frame in a rake having five raking wheels.

*Operation*

The operation of the rake of the instant invention is believed to be readily apparent and is briefly summarized at this point.

The tongue 17 preferably is connected by means of the draft connection 20 to the tool bar, not shown, of a prime mover such as a tractor for imparting earth traversing movement to the frame 11 along a forward line of travel substantially parallel to the tongue. Because the frame 11 is centrally balanced for elevational tilting movement around an axis concentric with the axis of the support wheels 55, the tongue is easily lifted upwardly into position.

For raking operations, the chains 88 are located in the locks 86 so that the teeth 77 of the raking wheels 75 lightly engage rakeable substance disposed on the ground. The frame is then drawn in earth traversing movement thereby to move the main beam 52 of the frame in oblique angular relation to the forward direction of movement. Again, it is to be noted that because of the frame construction providing centrally located, laterally extended support wheel mounting arms and support wheels thereon, the weight imposed on a tool bar or the like, not shown, to which the tongue 17 is connected, is negligible. For example, a popular model of the rake of the present invention has a total overall weight of approximately 700 pounds whereas, in practice, such a rake only places approximately 10 or 15 pounds on the tool bar or other prime mover draft connection.

As rakeable substance is encountered by the forwardmost raking wheel, the rearward drag on the teeth 77 downwardly disposed causes the wheel to turn and to pull encountered rakeable substance laterally for delivery to the successive rearwardly adjacent wheel. It is believed readily apparent that the successive wheels operate in a similar manner ultimately to form a windrow of rakeable substance laterally of the rearwardmost raking wheel in the manner of the rake of U. S. Patent No. 2,447,354.

It is to be noted that the ground engaging support wheel 55 disposed on the rearward side of the main beam 52 in no way damages encountered rakeable substance being raked inasmuch as it is always behind the raking action of the wheels 75. In addition, by proper manipulation of the frame 11 and the raking pattern in the field being worked, the other ground engaging wheel 55 can be made to avoid trampling engagement on the rakeable substance by being caused to traverse previously raked ground.

When the rake 10 passes over depressions and elevations in the terrain being traversed, the raking wheels 74 are permitted to descend and elevate in a light floating action. This is due to the mounting of the raking wheels permitting independent rotational and elevational movement and to their resilient support thereof. Thus, the raking wheels do not dig into the ground nor place excessive quantities of dirt in substances raked nor is there an excessive strain placed on the rake.

In particular, it is to be recognized that the form of the frame 11 provided for the rake 10 of the present invention completely obviates the need for overhead arch bars previously found necessary in prior art forms of side delivery rotary wheel rakes of the pull type. In this respect, the present invention has largely been made possible by mounting the raking wheels on forwardly extended push crank arms previously described and having advantages set forth in my co-pending application cited above. It will be appreciated that if the crank arms 65 were rearwardly extended from their pivot bearings 60, the extension of the arm portion 37 of the frame forwardly between adjacent raking wheels would be markedly disadvantageous if not actually impossible. If the arm 37 is not extended between such raking wheels, it must then become an arch member and extend upwardly over the raking wheels assuming all the expense of construction and other disadvantages known in the prior art. Simply reversing the direction of movement of the rake from that shown does not suffice, for then the tongue must become an arch member with the same disadvantages. The frame is of the utmost simplicity and economy of form and yet is highly durable and rugged, thus being suited to protracted operation over many and varied kinds of terrain. Of significance also is the fact that a frame constructed in accordance with the principles of this invention substantially reduces the weight of the rake without lessening its effectiveness.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. A rake comprising elongated beam members rigidly secured together in angular relation and providing a rigid assembly of legs in the general form of an X horizontally disposed, ground support wheels mounted adjacent to the extremities of one of the legs of the X in substantial axial alignment, substantially parallel bearings mounted along the other leg of the X obliquely to the axis of the support wheels, a plurality of rotary raking wheels arranged in echelon along the leg mounting the bearings, means engaged in the bearings individually mounting the raking wheels for free rotation and floating elevational movement in substantially equally spaced parallel planes, and a draft tongue secured to the assembly at a position within an angle formed by the legs and extended therefrom obliquely to both the axis of the wheels and the bearings, one of the legs mounting a support wheel being extended between a pair of adjacent raking wheels.

2. In a rotary side delivery wheel rake, a frame comprising a pair of substantially rigid elongated frame members each having opposite ends and opposite concave and convex sides, means rigidly interconnecting portions of the frame members intermediate their opposite ends with the convex sides thereof disposed toward each other, and a pair of substantially axially aligned ground support wheels mounted on respectively opposite ends of the opposite frame members, the ends of the frame members opposite to their respective ends mounting the support wheels being extended to opposite sides of the axis of the wheels and having portions substantially aligned obliquely to said wheel axis constituting a raking wheel mounting beam.

3. In a rotary side delivery rake, a frame comprising forward and rearward frame members each having predetermined forward and rearward end portions and oppositely disposed concave and convex sides, means rigidly interconnecting the frame members intermediate their forward and rearward end portions with the convex sides thereof in adjacent facing relation, with the forward end portion of the forward frame member and the rearward end portion of the rearward frame member being substantially aligned and constituting a main beam and with the forward end portion of the rearward frame member and the rearward end portion of the forward frame member being oppositely laterally extended from said main beam, a plurality of rotary raking wheels, means mounting the raking wheels for rotational movement on the main beam with a pair of adjacent raking wheels being disposed on opposite sides of the forward end portion of the rearward frame member, and ground support wheels mounted on the forward end portion of the rearward frame member and the rearward end portion of the forward frame member.

4. In a rotary side delivery rake; a frame including a pair of elongated frame members each having a raking wheel mounting arm, a support wheel mounting arm, a consave side and a convex side; means interconnecting the frame members in a substantially common plane with the convex sides thereof in adjacent facing relation, with the raking wheel mounting arm of each member in acute angular relation to the adjacent support wheel mounting arm of the other member and with the raking wheel mounting arms in substantial alignment; ground engaging support wheels mounted on the support wheel mounting arms for rotation around a substantially common axis for guiding the frame along a predetermined line of travel; a plurality of rotary raking wheels mounted on the concave side of the rearward raking wheel mounting arm and on the convex side of the forward raking wheel mounting arm in echelon arrangement, in spaced parallel planes oblique to said line of travel and on opposite sides of the support wheel mounting arm of the rearward frame member.

5. In a rotary side delivery rake, a support frame for the rake comprising a forward and a rearward frame member each having predetermined forward and rearward end portions and oppositely disposed concave and convex sides; means rigidly interconnecting the frame members intermediate their end portions with the convex sides in facing relation, with the forward end portion of the forward frame member in substantial axial alignment with the rearward end portion of the rearward frame member and with the forward and rearward end portions of the rearward and forward frame members, respectively, extended oppositely laterally from the aligned portions of said members; ground engaging support wheels mounted on the forward and rearward end portions of the rearward and forward frame members, respectively, for rotation about a substantially common axis oblique to the aligned portions of the frame members for guiding the frame along a line of travel normal to said axis; a plurality of rotary raking wheels; means individual to the raking wheels mounting the wheels on the concave side of the rearward end portion of the rearward frame member and on the convex side of the forward end portion of the forward frame member in predetermined angular relation to said portions on which they are mounted in overlapping echelon arrangement and for individual free rotational and elevational movement in substantially parallel planes oblique to said line of travel, the wheel mounting means including individual pivot axes on the end portions of the frame member to which they are mounted substantially normal to the planes of their respective wheels and axles substantially parallel to the pivotal axes forwardly spaced from their respective pivotal axes and rotatably mounting the raking wheels thereon.

6. In a rotary side delivery wheel rake having a predetermined direction of movement, the combination of a substantially flat horizontal frame having a rearwardly extended arm, a forwardly extended arm substantially aligned with the rearwardly extended arm, oppositely laterally extended arms, and means interconnecting the arms in rigid assembly; a tongue connected to the frame and extended therefrom obliquely to the aligned forwardly and rearwardly extended arms of the frame; support wheels rotatably mounted on the laterally extended arms in substantially parallel planes oblique to the aligned arms; and a plurality of rotary raking wheels rotatably mounted in substantially parallel equally spaced relation on the aligned arms in oblique angular relation to the planes of the support wheels, one of the laterally extended arms of the frame being disposed between adjacent parallel raking wheels.

7. In a rotary side delivery wheel rake having a predetermined intended direction of earth traversing movement in relation to the rake, the combination of a substantially flat horizontal frame having a rearwardly extended arm, a forwardly extended arm substantially aligned with the rearwardly extended arm, opposite laterally extended arms, and means rigidly interconnecting the arms at a substantially common juncture; a tongue connected to the interconnecting means and extended there from obliquely to the aligned forwardly and rearwardly extended arms of the frame; support wheels journalled on the laterally extended arms in planes substantially parallel to the tongue; a plurality of rotary raking wheels disposed in echelon substantially parallel equally spaced relation adjacent to the aligned arms in oblique angular relation to the tongue and opposite to said aligned arms from the tongue; and means individually mounting the raking wheels on the aligned arms for free rotation and individual floating action, one of the laterally extended arms of the frame being disposed between adjacent parallel raking wheels with the support wheels on opposite sides of the raking wheels.

8. In a side delivery rake, a pair of substantially rigid arcuate elongated frame members each having predetermined forward and rearward end portions and opposite concave and convex sides, the frame members being arranged with their convex sides in facing engagement, means rigidly interconnecting the frame members intermediate their opposite end portions with the forward end portion of one of the members in substantial alignment with the rearward end portion of the opposite frame member and with the opposite end portions of the members oppositely transversely extended from said aligned end portions, a pair of support wheels mounted on said oppositely transversely extended end portions of the frame members for rotation about a substantially common axis oblique to the aligned end portions of the frame members, and means rigidly connected to the frame members adapted to impart earth traversing movement to the rake along a line of movement substantially normal to the axes of the support wheels.

9. In a side delivery rake having a predetermined forward line of travel, the combination of a forward beam and a rearward beam, the forward beam having a lateral arm extended in substantially right angular relation to the line of travel, a forward arm forwardly extended obliquely to the line of travel and an elbow integrally interconnecting the forward and the lateral arms; the rearward beam having a rearward arm rearwardly extended in substantial alignment with the forward arm of the forward beam, a lateral arm extended transversely of the line of travel opposite to the aligned arms from the lateral arm of the forward beam, and an elbow integrally interconnecting the rearward beam and the lateral arm rigidly connected to the elbow of the forward beam; a pair of ground engaging support wheels; means mounting the support wheels on the lateral arms of the beams for rotation about substantially aligned axes normal to said line of travel; and a draft tongue rigidly connected to said beams.

10. In a side delivery rake, the combination of a pair of substantially rigid elongated arcuate frame members each having opposite end portions and opposite concave and convex sides, the concave sides of said members being oppositely disposed and the convex sides being in facing engagement, means rigidly interconnecting the frame members intermediate their opposite end portions, a pair of substantially axially aligned ground support wheels mounted on respectively opposite end portions of the opposite frame members predetermining a line of movement of the frame relative to the frame, the end portions of the frame members opposite to their respective end portions mounting the support wheels being extended to opposite sides of the axis of the wheels and being substantially horizontally aligned obliquely to said wheel axis, and means coupled to the interconnecting means adapted to impart earth traversing movement to the frame along said predetermined line.

11. In a side delivery rake having a predetermined forward line of travel relative thereto, the combination of a forward beam and a rearward beam, the forward beam having a lateral arm extended in substantially right angular relation to the line of travel, a forward arm forwardly extended obliquely to the line of travel and an elbow integrally interconnecting the forward and the lateral arms; the rearward beam having a rearward arm rearwardly extended in substantial alignment with the forward arm of the forward beam, a lateral arm extended transversely of the line of travel opposite to the aligned arms from the lateral arm of the forward beam, and an elbow integrally interconnecting the rearward beam and the lateral arm rigidly connected to the elbow of the forward beam, the arms and elbows lying in a substantially common horizontal plane except for the extended ends of the lateral arms which are extended downwardly from said plane; a pair of ground engaging support wheels; means mounting the support wheels on downwardly extended ends of the lateral arms for rotation about substantially aligned axes normal to said line of travel; and means coupled to said beams adapted to impart earth traversing movement thereto along said line of travel.

12. In a rotary side delivery rake, a forward frame member; a rearward frame member, each of said frame members having predetermined forward and rearward end portions and oppositely disposed concave and convex sides; means rigidly inter-connecting the frame members intermediate their forward and rearward end portions with the convex sides thereof in facing engagement, with the forward end portion of the forward frame member and the rearward end portion of the rearward frame member being substantially aligned and constituting a main beam and with the forward end portion of the rearward frame member and the rearward end portion of the forward frame member being oppositely laterally extended from said main beam; a plurality of rotary raking wheels; means mounting the raking wheels for free rotational movement in echelon arrangement along a common side of the main beam and on opposite sides of a laterally extended end portion of one of the frame members; and frame support means connected to the laterally extended end portions of the frame members supporting the rake for earth traversing movement along a line of travel oblique to the main beam.

References Cited in the file of this patent

UNITED STATES PATENTS

| | | |
|---|---|---|
| 1,536,001 | Hayes | Apr. 28, 1925 |
| 2,447,354 | Morrill | Aug. 17, 1948 |
| 2,583,383 | McClellan | Jan. 22, 1952 |
| 2,620,201 | Brady | Dec. 2, 1952 |
| 2,635,411 | Hicks | Apr. 21, 1953 |